(12) United States Patent
Stilson

(10) Patent No.: US 12,214,238 B2
(45) Date of Patent: Feb. 4, 2025

(54) CLAMPING DEVICE

(71) Applicant: Coulter Ventures, LLC., Columbus, OH (US)

(72) Inventor: Tyler Scott Stilson, Frederick, CO (US)

(73) Assignee: Coulter Ventures, LLC., Columbus, OH (US)

( * ) Notice: Subject to any disclaimer, the term of this patent is extended or adjusted under 35 U.S.C. 154(b) by 29 days.

(21) Appl. No.: 18/123,603

(22) Filed: Mar. 20, 2023

(65) Prior Publication Data

US 2023/0293931 A1 Sep. 21, 2023

Related U.S. Application Data

(63) Continuation of application No. 17/208,062, filed on Mar. 22, 2021, now Pat. No. 11,607,576, which is a
(Continued)

(51) Int. Cl.
*A63B 21/072* (2006.01)
*F16B 2/18* (2006.01)

(52) U.S. Cl.
CPC ...... *A63B 21/0728* (2013.01); *A63B 21/0724* (2013.01); *F16B 2/185* (2013.01)

(58) Field of Classification Search
CPC .......... A63B 21/0004; A63B 21/00058; A63B 21/00069; A63B 21/00072; A63B 21/02;
(Continued)

(56) References Cited

U.S. PATENT DOCUMENTS

| 1,303,249 A | 5/1919 | Brown |
| 2,108,407 A | 2/1938 | Lockhart |

(Continued)

FOREIGN PATENT DOCUMENTS

| EP | 2975274 A1 | 1/2016 |
| FR | 2699969 A1 | 7/1994 |

(Continued)

OTHER PUBLICATIONS

Product listing for Muscle Clamps from https://www.roguefitness.com/muscle-clamps , dated Sep. 19, 2018, product known to be available as of Nov. 13, 2014.
(Continued)

*Primary Examiner* — Gary D Urbiel Goldner
(74) *Attorney, Agent, or Firm* — Banner & Witcoff, Ltd.

(57) ABSTRACT

A clamping device for securely engaging one or more objects through an application of pressure. The clamping device includes a primary member having opposed interior and exterior surfaces. The primary member has a generally cylindrical shape such that the interior surface defines a generally circular space about a center point of the primary member. The clamping device can receive an elongated member through the generally circular space circumscribed by the primary member. The primary member is adapted for clamping and releasing such that the clamping device may releasably engage the elongated member. The elongated member is securely retained by the clamping device through the application of pressure.

20 Claims, 7 Drawing Sheets

Related U.S. Application Data continuation of application No. 16/213,258, filed on Dec. 7, 2018, now Pat. No. 10,953,263, which is a continuation of application No. 16/044,098, filed on Jul. 24, 2018, now Pat. No. 10,226,659, which is a continuation of application No. 15/860,089, filed on Jan. 2, 2018, now Pat. No. 10,512,815, which is a continuation of application No. 14/943,024, filed on Nov. 16, 2015, now Pat. No. 9,855,458.

(60) Provisional application No. 62/080,168, filed on Nov. 14, 2014.

(58) Field of Classification Search
CPC ... A63B 21/023; A63B 21/025; A63B 21/026; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/055; A63B 21/0552; A63B 21/0555; A63B 21/0557; A63B 21/06; A63B 21/072; A63B 21/0722; A63B 21/0724; A63B 21/0726; A63B 21/0728; A63B 21/075; A63B 21/08; A63B 21/15; A63B 21/151; A63B 21/159; A63B 21/4023; A63B 21/4027; A63B 21/4033; A63B 21/4035; A63B 21/4043; A63B 21/4045; A63B 21/4047; A63B 21/4049; A63B 71/0054; A63B 2071/0063; A63B 2071/0072; A63B 2071/0081; A63B 2071/009; A63B 2209/14; A63B 2225/09; A63B 2244/09; Y10T 24/1412; Y10T 24/1424; Y10T 24/1418; Y10T 24/142; F16B 2/06; F16B 2/18; F16B 2/185
See application file for complete search history.

(56) References Cited

U.S. PATENT DOCUMENTS

| | | |
|---|---|---|
| 2,244,351 A | 6/1941 | Venables |
| 3,113,791 A | 12/1963 | Frost et al. |
| 3,305,234 A | 2/1967 | Cline et al. |
| 4,492,005 A | 1/1985 | Begley et al. |
| D280,433 S | 9/1985 | Lincir |
| 4,569,105 A | 2/1986 | Weider |
| 4,585,367 A * | 4/1986 | Gall .................. A63B 21/0728 403/372 |
| D287,387 S | 12/1986 | Oliver et al. |
| 4,639,979 A | 2/1987 | Polson |
| 4,646,398 A | 3/1987 | Myhrman |
| 4,678,216 A | 7/1987 | Gregory |
| 4,773,641 A | 9/1988 | Metz |
| 4,817,944 A | 4/1989 | Anderson et al. |
| 4,893,810 A | 1/1990 | Lee |
| 5,013,177 A * | 5/1991 | Sol .......................... F16B 2/185 403/374.5 |
| 5,062,631 A | 11/1991 | Dau et al. |
| 5,108,066 A | 4/1992 | Lundstrom |
| 5,163,887 A | 11/1992 | Hatch |
| 5,207,624 A | 5/1993 | Paskovich |
| 5,295,604 A | 3/1994 | Van Ryswyk |
| 5,295,933 A | 3/1994 | Ciminski et al. |
| 5,591,109 A | 1/1997 | Strnad |
| 5,593,210 A * | 1/1997 | Schwarzbich ........ F16H 31/001 192/223.2 |
| D384,710 S | 10/1997 | Pahel |
| 5,829,106 A | 11/1998 | Dams et al. |
| D414,405 S | 9/1999 | Tompkins |
| D438,783 S | 3/2001 | Elliott |
| D445,153 S | 7/2001 | Lincir |
| D464,094 S | 10/2002 | Fond |
| 7,243,962 B2 | 7/2007 | Stolzman |
| 7,261,263 B2 | 8/2007 | Baker et al. |
| D584,604 S | 1/2009 | Baldwin |
| 7,497,489 B2 | 3/2009 | Baughman et al. |
| 7,513,856 B2 | 4/2009 | Jones |
| 7,789,814 B1 | 9/2010 | Xu |
| 8,142,335 B1 | 3/2012 | Leach et al. |
| D661,981 S | 6/2012 | Melino, Sr. et al. |
| 8,201,852 B2 | 6/2012 | Linhorst et al. |
| 8,282,138 B2 | 10/2012 | Steiner |
| D694,841 S | 12/2013 | Ciminski et al. |
| 8,602,403 B1 * | 12/2013 | Chen ...................... F16M 13/022 269/232 |
| D711,730 S | 8/2014 | McKiernan |
| D712,730 S | 9/2014 | Gridley |
| 8,827,878 B1 | 9/2014 | Ciminski et al. |
| 8,985,647 B2 | 3/2015 | Kuzelka |
| D735,025 S | 7/2015 | Mathien |
| D736,884 S | 8/2015 | Lovley, II et al. |
| 9,109,616 B1 | 8/2015 | Ballentine |
| 9,212,777 B2 | 12/2015 | Shi |
| D764,608 S | 8/2016 | Jones |
| D766,384 S | 9/2016 | Jones |
| D780,859 S | 3/2017 | Ramsey et al. |
| D780,860 S | 3/2017 | Jones |
| D780,861 S | 3/2017 | Jones |
| 9,764,183 B2 | 9/2017 | Roepke |
| D798,699 S | 10/2017 | Roiser |
| 9,855,458 B2 | 1/2018 | Stilson |
| 10,226,659 B2 | 3/2019 | Stilson |
| 10,335,628 B1 | 7/2019 | Scarpa |
| D855,920 S | 8/2019 | Schenone et al. |
| D861,473 S | 10/2019 | Yesavage et al. |
| D865,881 S | 11/2019 | Muir et al. |
| 10,512,815 B2 | 12/2019 | Stilson |
| D876,944 S | 3/2020 | Fleck et al. |
| D885,877 S | 6/2020 | Magagna et al. |
| D895,745 S | 9/2020 | Jones |
| 10,953,263 B2 | 3/2021 | Stilson |
| D941,408 S | 1/2022 | Jones |
| 11,359,653 B2 | 6/2022 | Huang et al. |
| 11,565,143 B2 | 1/2023 | Jones |
| D979,677 S | 2/2023 | Liu |
| 11,607,576 B2 * | 3/2023 | Stilson ............... A63B 21/0724 |
| 11,835,073 B2 | 12/2023 | Stilson |
| 2007/0074917 A1 * | 4/2007 | Jaenke ..................... F16B 2/065 180/65.1 |
| 2007/0138351 A1 | 6/2007 | Wu |
| 2008/0287271 A1 | 11/2008 | Jones |
| 2009/0048079 A1 | 2/2009 | Nalley |
| 2011/0162173 A1 | 7/2011 | Ciminski et al. |
| 2013/0072359 A1 | 3/2013 | Leach et al. |
| 2013/0196830 A1 | 8/2013 | Pfitzer |
| 2014/0121075 A1 | 5/2014 | Brown |
| 2014/0162855 A1 | 6/2014 | Beckman |
| 2014/0200119 A1 | 7/2014 | Sides, Jr. |
| 2014/0287889 A1 | 9/2014 | Grace et al. |
| 2015/0231441 A1 | 8/2015 | Davies, III |
| 2016/0025121 A1 | 1/2016 | Ahnert et al. |
| 2017/0095688 A1 | 4/2017 | Stilson |
| 2017/0144012 A1 | 5/2017 | Stilson |
| 2017/0151460 A1 | 6/2017 | Jennings et al. |
| 2018/0185696 A1 | 7/2018 | Stilson |
| 2018/0272175 A1 | 9/2018 | Henniger |
| 2018/0326251 A1 | 11/2018 | Stilson |
| 2019/0105525 A1 | 4/2019 | Stilson |
| 2020/0171339 A1 | 6/2020 | Jones |
| 2021/0001165 A1 | 1/2021 | Stilson |
| 2021/0001166 A1 | 1/2021 | Stilson |
| 2021/0205653 A1 * | 7/2021 | Stilson ............... A63B 21/0724 |
| 2022/0143453 A1 | 5/2022 | Martin |

FOREIGN PATENT DOCUMENTS

| | | | |
|---|---|---|---|
| GB | 685710 A | 1/1953 | |
| GB | 781761 A * | 8/1957 | .............. F16B 2/185 |
| GB | 2186500 A | 8/1987 | |
| GB | 2397254 A | 7/2004 | |

(56) References Cited

FOREIGN PATENT DOCUMENTS

| WO | 2011011773 A2 | 1/2011 |
|---|---|---|
| WO | 2015134826 A2 | 9/2015 |
| WO | 2017046731 A1 | 3/2017 |

OTHER PUBLICATIONS

Product listing for Rogue Proloc Collars from https://www.roguefitness.com/rogue-proloc-collars, dated Sep. 19, 2018, product known to be available as of Nov. 13, 2014.
Product listing for Rogue Spring Collars from https://www.roguefitness.com/spring-collars , dated Sep. 19, 2018, product known to be available as of Nov. 13, 2014.
Product listing for Rogue HG Collars from https://web.archive.org/web/20141007093507/http://www.roguefitness.com/rogue-hg-collars, dated Oct. 7, 2014.
Product listing for Rogue Proloc Blocker from https://www.roguefitness.com/proloc-blocker, dated Sep. 19, 2018, product known to be available as of Nov. 13, 2014.
Product listing for Rogue Proloc 2 Chain Collars from https://www.roguefitness.com/rogue-proloc-2-collars-pair, dated Sep. 19, 2018, product known to be available as of Nov. 13, 2014.
Product listing for Rogue Metal HG Collars from https://web.archive.org/web/20151012215636/http://www.roguefitness.com:80/rogue-metal-hg-collars, dated Oct. 12, 2015.
Product listing for Eleiko International Collars from https://www.ebay.co.uk/itm/Eleiko-Olympic-Weight-Lifting-Training-Collars-Clips-IWF-IPF-approved-Commercial-/112533462103, dated Sep. 19, 2018, product known to be available as of Nov. 13, 2014.
Product listing for Eleiko Competition Collars from https://web.archive.org/web/20120228055629/http://www.roguefitness.com:80/eleiko-collars.php, dated Feb. 28, 2012.
Product listing for Ader Spring Collars from https://web.archive.org/web/20131119152405/http://www.roguefitness.com:80/ader-spring-collars.php, dated Nov. 19, 2013.
Product listing for Rogue Metal Axle Collars from https://web.archive.org/web/20141010232044/http://www.roguefitness.com:80/rogue-metal-axle-collars, dated Oct. 10, 2014.
Product listing for Uesaka Sevi Competition Collars from https://web.archive.org/web/20151118052603/http://www.roguefitness.com:80/uesaka-sevi-competition-collars , dated Nov. 18, 2015, product known to be available as of Nov. 15, 2015.
Product listing for Rogue Proloc Collars Red from https://www.roguefitness.com/rogue-proloc-collars-red, dated Sep. 19, 2018, product known to be available as of Nov. 13, 2014.
Product listing showing Strongman Specialty Barbell Spring Clamp from https://web.archive.org/web/20120223160336/https://www.roguefitness.com/rogue-farmers-walk-handles.php, dated Feb. 23, 2012.
Web page https://web.archive.org/web/20151113160442/http://www.roguefitness.com:80/weightlifting-bars-plates/collars, dated Nov. 13, 2015.
Web page https://web.archive.org/web/20141007081926/http://www.roguefitness.com/weightlifting-bars-plates/collars, dated Oct. 7, 2014.
Web Page https://web.archive.org/web/20150826081003/http://www.roguefitness.com:80/weightlifting-bars-plates/collars, dated Aug. 26, 2015.
Photograph of Berg Hantel Collar, publicly disclosed prior to Jul. 2, 2018.
Image 2: Photograph of IWF Certified Eleiko Collar, publicly disclosed prior to Jul. 2, 2018.
Image 3: Photograph of IWF Certified Eleiko Collar, publicly disclosed prior to Jul. 2, 2018.
ELEIKO IWF Weightlifting Competition Collars—Pair; downloaded Apr. 8, 2020; https://www.eleiko.com/en/p/eleiko-iwf-weightlifting-competition-collars-pair/73ffgs.3ba0s74 pages.
Rogue Loadable Dumbbells by Rogue dated Mar. 23, 2017. Found online [Mar. 23, 2020] https://www.roguefitness.com/rogue-loadable-dumbbells?bvstate=pg:3/ct:r.
Product listing for Rogue HG 2.0 Collars, From: http:/web.archive.org/web/20181122030721/https:/www.roguefitness.com/rogue-hg-2-0-collars, dated May 22, 2017, accessed Jun. 22, 2021.
Product listing for Rogue OSO Barbell Collars, From: http://web.archive.org/web/20180603060359/https:/www.roguefitness.com/rogue-oso-barbell-collars, dated May 22, 2015, accessed Jun. 22, 2021.
"Rogue USA Aluminum Barbell Collars. First Impressions", Oct. 10, 2018, YouTube.com, site visited Sep. 2, 2021: https://www.youtube.com/watch?v= 1mJ08JS12vc (Year: 2018).
"Collars—Rogue HG 2.0 Collars", Jul. 3, 2017, roguefitness.com via archive.org, site visited Sep. 10, 2021: https://web.archive.org/web/20170703192542/https://www.roguefitness.com/weightlifting-bars-plates/collars (Year: 2017).
Powerfeng, announced 2021 [online], [site visited Apr. 25, 2023]. Available on internet, URL:https://www.amazon.com/ <http://www.amazon.com/> Powerfeng-Olympic-Barbell-Clamps-Clips/dp/B09LCY9VZK/ref (Year: 2021).
Lockjaw barbell collars store, announced 2021 [online], [site visited Apr. 25, 2023]. Available on internet, URL:https://www.amazon.com/Lock-Jaw-Release-Aluminum-Barbell-Collar/dp/B09PSKF8YM/ref <http://www.amazon.com/Lock-Jaw-Release-Aluminum-Barbell-Collar/dp/B09PSKF8YM/ref>(Year: 2022).

* cited by examiner

CLAMPING DEVICE

CROSS-REFERENCE TO RELATED APPLICATIONS

This application is a continuation of U.S. patent application Ser. No. 17/208,062, filed Mar. 22, 2021, and issued as U.S. Pat. No. 11,607,576 on Mar. 21, 2023, which is a continuation of U.S. patent application Ser. No. 16/213,258, filed Dec. 7, 2018, and issued as U.S. Pat. No. 10,953,263 on Mar. 23, 2021, which is a continuation of U.S. patent application Ser. No. 16/044,098, filed Jul. 24, 2018, and issued as U.S. Pat. No. 10,226,659 on Mar. 12, 2019, which is a continuation of U.S. patent application Ser. No. 15/860,089, filed Jan. 2, 2018, issued as U.S. Pat. No. 10,512,815 on Dec. 24, 2019, which is a continuation of U.S. patent application Ser. No. 14/943,024, filed Nov. 16, 2015, and issued as U.S. Pat. No. 9,855,458 on Jan. 2, 2018, which claims the benefit of U.S. Provisional Application No. 62/080,168, filed on Nov. 14, 2014, all of which prior applications are incorporated by reference herein and made part hereof.

BACKGROUND OF THE INVENTION

1. Field of the Invention

The present invention relates generally to clamping devices. More particularly, the present invention relates to a device used to secure weights on exercise equipment.

2. Description of the Related Art

A clamping device is an apparatus that engages one or more objects for the purpose of securely retaining the object or objects. Design considerations for clamping devices include overall size, weight, number of component parts, means for joining component parts, quality of feedstock, likelihood of improper use, ability to prevent movement and separation when engaging multiple objects, propensity to become deformed or break through use, and means for engaging and releasing the device.

These design considerations will affect whether a clamping device is able to function reliable and in what circumstances. It is possible for more than one of the identified considerations to impact a single design feature. Typically, clamping devices take a limited number of the above design factors into consideration.

Thus, a clamping device capable of reliably engaging one or more objects securely may be too large or heavy for the intended use. Alternatively, such a clamping device may sacrifice ease of use for reliability. Providing for the use of additional tools can increase the ability of a clamping device to securely engage an object, while making the device more difficult to use. Ease of use can also influence whether a clamping device is regularly used or adopted by potential users.

Another potential tradeoff is a reduction in the quality of feedstock to reduce production cost. Clamping devices constructed at least in part from inexpensive or substandard material can degrade through both use and the passage of time.

It is also desired that the clamping device not damage an engaged object or objects. A clamping device that allows a user to determine the distance between the points of contact between the device and a target object can be over tightened, increasing the possibility of damage to the object. Also, if a contact surface of a clamping device is made of coarse materials it is more likely to damage a retained object. The likelihood that damage will occur with such a device is increased if it is used during high impact activities.

Clamping devices are commonly used during weight training to reduce conditions that restrict performance of an exercise or the ability to perform an exercise in a safe manner. Undesirable conditions include instability, imbalance, oscillation of movable parts, and separation of removable components from assemblies, equipment or apparatuses. These conditions pose a safety risk due to potential injuries.

To limit these undesirable conditions, a clamping device is favored that is able remain securely engaged throughout the entire movement required of an exercise. It is also desirable for the clamping device to remain securely engaged throughout all successive repetitions of the exercise.

A common training assembly used during weight training is a barbell with removable weights loaded on in it. A clamping device can be employed to prohibit separation of the removable weights of that assembly. Additionally, a clamping device that can securely engage the barbell is desirable to prevent movement of the weights while on the barbell.

Moreover, removable weights often incorporate a sleeve positioned around their inside surface that contacts the exterior surface of the barbell. Clamping devices used to retain the weights on the barbell can damage the sleeve if the surface area that contacts the weight is insignificant due to the thickness of the clamping device.

Clamping devices which attempt to address more than one of the identified problems are often difficult to manufacture. More difficult still to manufacture such clamping devices economically. Thus, a clamping device that solves more than one of the aforementioned problems is desired.

SUMMARY OF THE INVENTION

A clamping device is disclosed for securely engaging one or more objects through the application of pressure. The clamping device includes a primary member having opposed interior and exterior surfaces. The primary member has a generally cylindrical shape such that the interior surface defines a generally circular space about the center point of the primary member. The clamping device can receive an elongated member through the generally circular space circumscribed by the primary member.

The clamping device is adapted for clamping and releasing and incorporates a means for releasably engaging the elongated member. The means for releasably engaging the elongated member has opposed open and closed positions. The means for releasably engaging the elongated member is attached to the primary member such that when the means for releasably engaging the elongated member is in the closed position, the elongated member is securely engaged by the clamping devices through the application of pressure.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
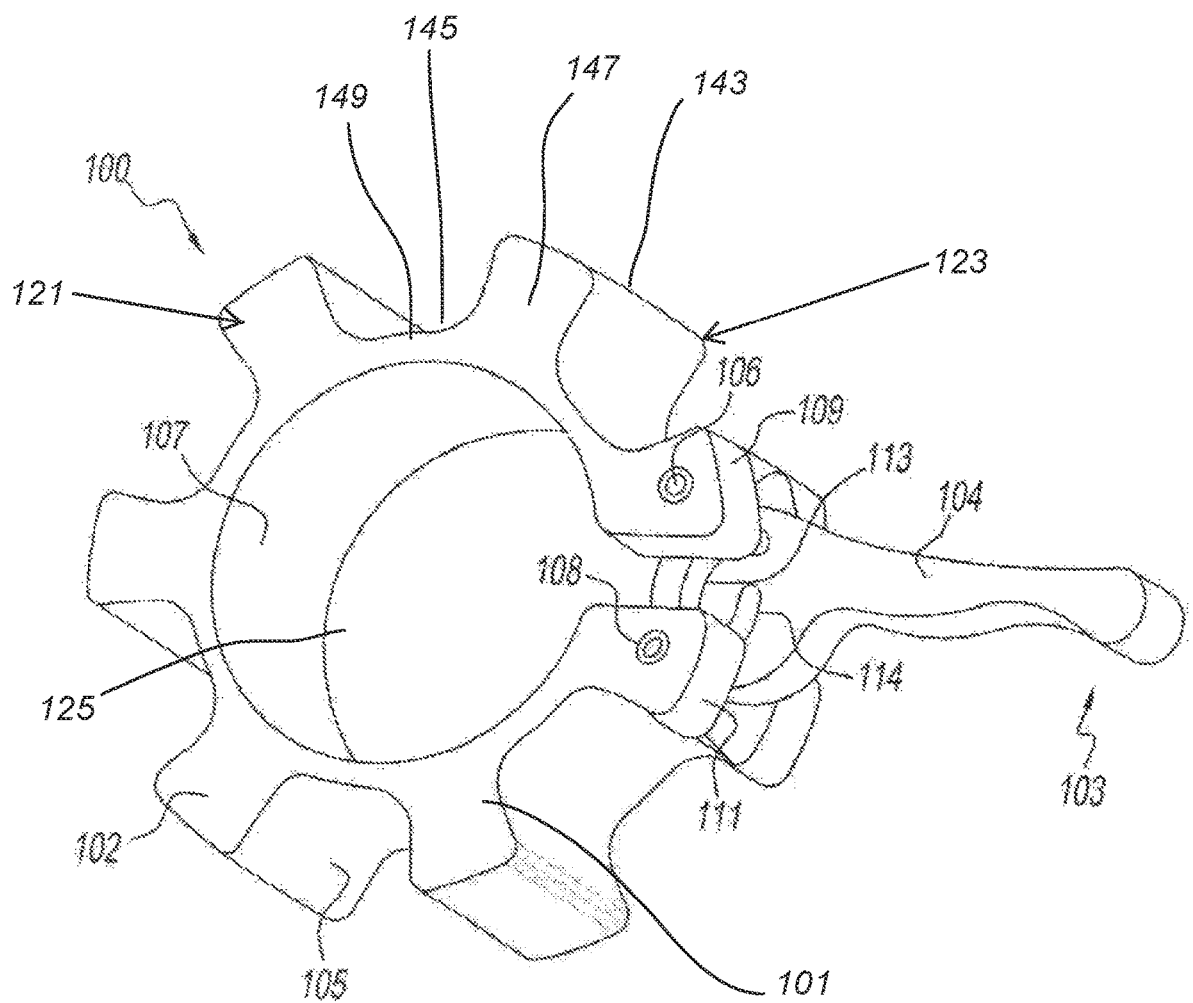
FIG. 2 is perspective view of an exemplary embodiment of the invention in the opened position.

In various exemplary embodiments, the present invention relates to a clamping device 100. As shown in the exemplary embodiment in FIG. 3, the clamping device 100 securely retains one or more objects through the application of pressure. A perspective view of one embodiment of the clamping device is shown in FIG. 2. As illustrated in FIG. 2, the clamping device 100 is shown with a primary member 102 that has a generally cylindrical body 101 extending between a front surface 121 and a rear surface 123 of the primary member 102, and defining a central passage 125 extending between the front and rear surfaces 121, 123. The primary member 102 is one continual piece throughout its length. The primary member 102 has an interior surface 107 and an opposed exterior surface 105. The interior and exterior surfaces 107, 105 follow a generally circular path about the center of the primary member 102.

Figure 1:
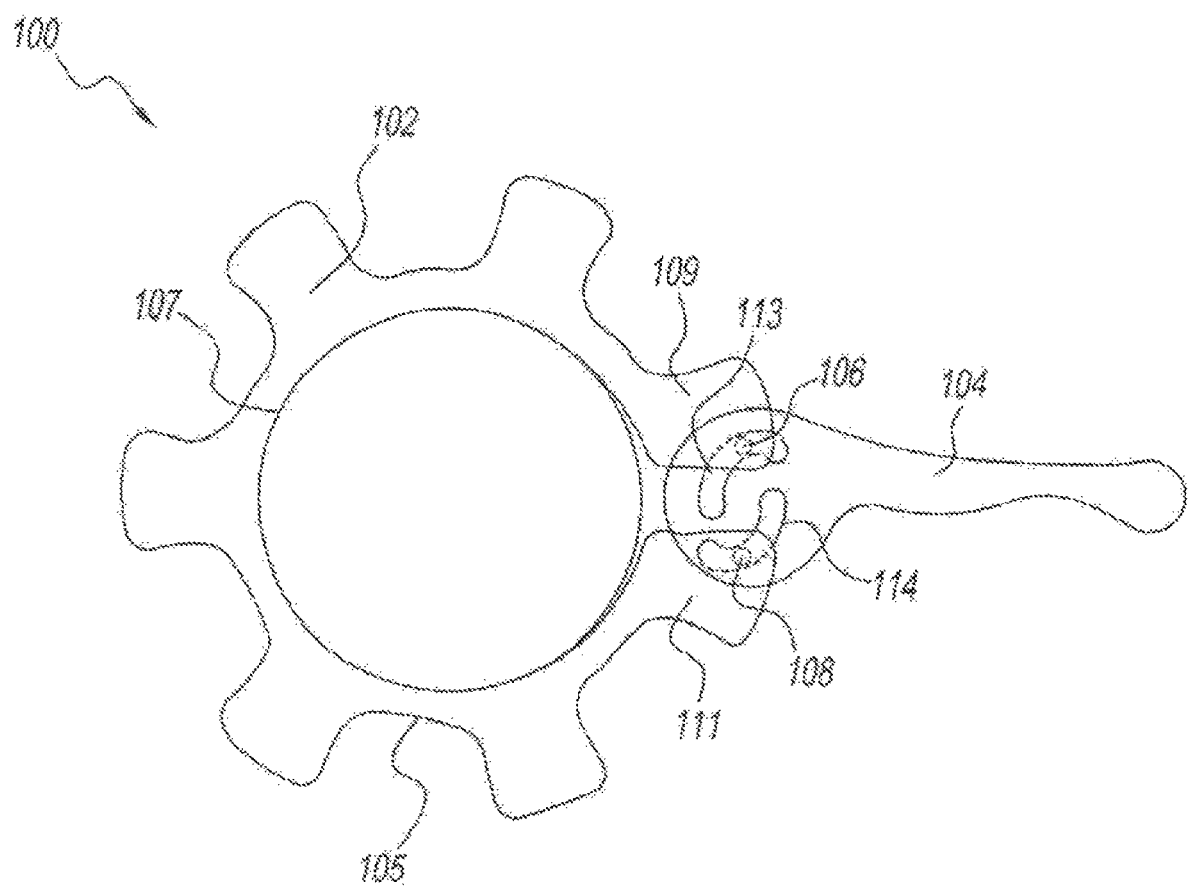
FIG. 1 is an end view of an exemplary embodiment of the invention in the opened position.
Figure 3:
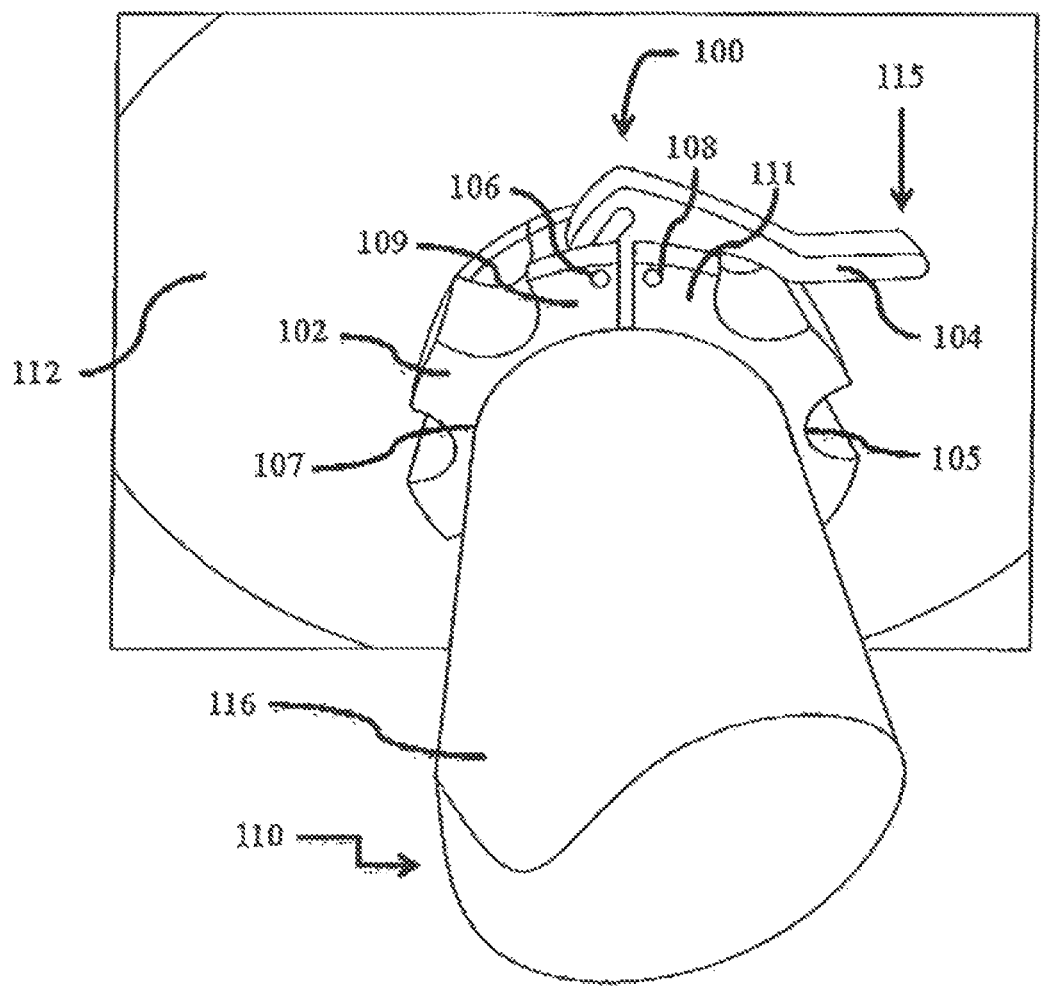
FIG. 3 is a perspective view of an exemplary embodiment of the invention in the closed position.
Figure 7:
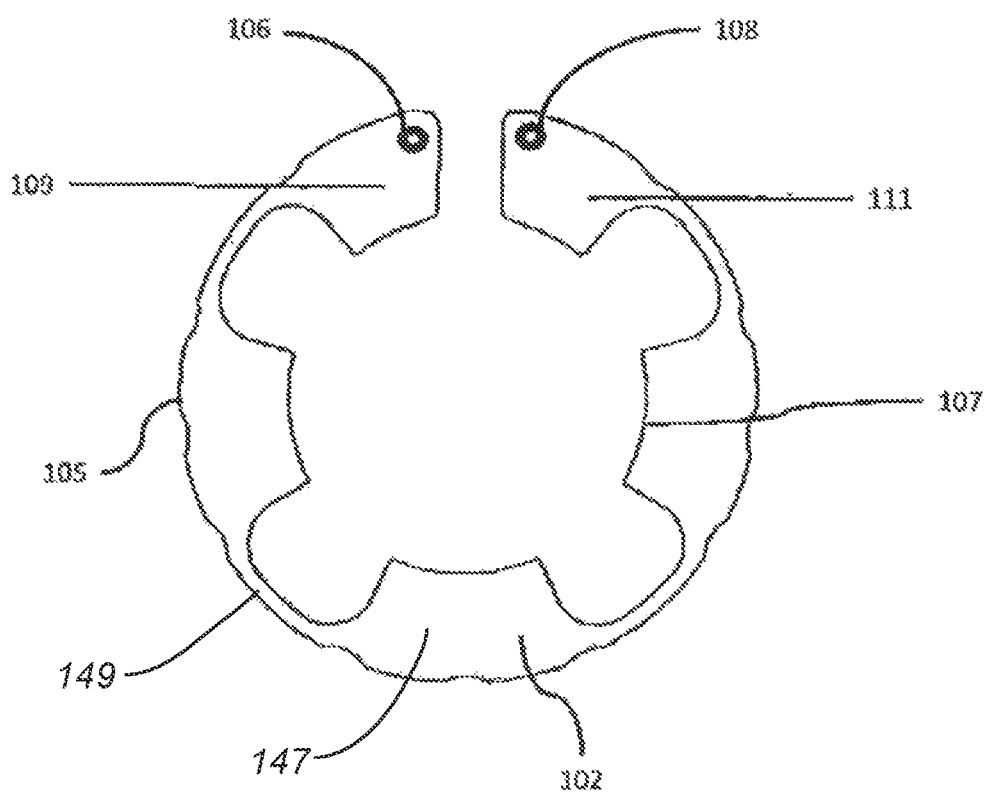
FIG. 7 is an end view of another exemplary embodiment of the invention.

The primary member 102 in FIGS. 1-3 has a plurality of alternating thin sections 147 and thick sections 149, the thick sections 147 having increased thickness with respect to the thin sections 149. In the particular embodiment shown in FIG. 2, the exterior surface 105 follows a generally parabolic path when the clamping device 100 is observed from an end view, such that the thick and thin sections 147, 149 form alternating raised portions 143 and recessed portions 145 on the exterior surface. The pattern displayed by the exterior surface 105 in this embodiment is optional. Other potential patterns include those that are substantially triangular or crescent when viewing the clamping device 100 from an end view. FIG. 7 shows the exterior surface 105 remaining generally circular around the circumference of the primary member 102. The opposed interior surface 107 moves closer and further away from the exterior surface 105 as the interior and exterior surfaces 107, 105 move in a generally circular direction about the center of the primary member 102.

FIG. 2 further shows the primary member 102 with two extremities 109, 111. The primary member being sufficiently rigid to bias the first extremity 109 away from the second extremity 111. The two extremities 109, 111 being sufficiently distant from each other 109, 111 to allow one or more objects to pass through the center of the primary member 102 (not shown). An elongated member being one such potential object. The clamping device 100 having a means for releasably engaging 104 such elongated member. In this particular embodiment, each of the two extremities 109, 111 is joined to the means for releasably engaging the elongated member 104. Further, in this embodiment, the means for releasably engaging the elongated member is a lever 104. The lever 104 is a preferred means for releasably engaging the elongated member, but not required.

FIG. 2 further shows the lever 104 in an open position 103. Lever 104 will cause the clamping device 100 to engage the elongated member by transitioning from the open position 103 to a closed position 115. In this embodiment, pins 106, 108 are vertically oriented parallel to the interior and exterior surfaces 107, 105. Each pin 106, 108 extends the height of one extremity 109, 111. The pins 106, 108 join the lever 104 to each extremity 109, 111 by extending vertically through counterposed arcuate holes 113, 114 formed through the lower end of the lever 104.

FIG. 2 further shows lever 104 pivots radially about the midpoint of the pins 106, 108 approximately ninety degrees to transition from the open position 103 to the closed position 115. FIG. 3 shows lever 104 causing the clamping device 100 to engage a barbell by being positioned in the closed position 115. In this embodiment, lever 104 decreases the circumference and diameter of the primary member 102 simultaneously when transitioning from the open position 103 to the closed position 115. FIG. 3 further shows clamping device 100 protecting a sleeve positioned around the inside surface of the weight that contacts the exterior surface of the barbell by radially extending from the center of the barbell higher than the interior surface of the weight.

Figure 4:
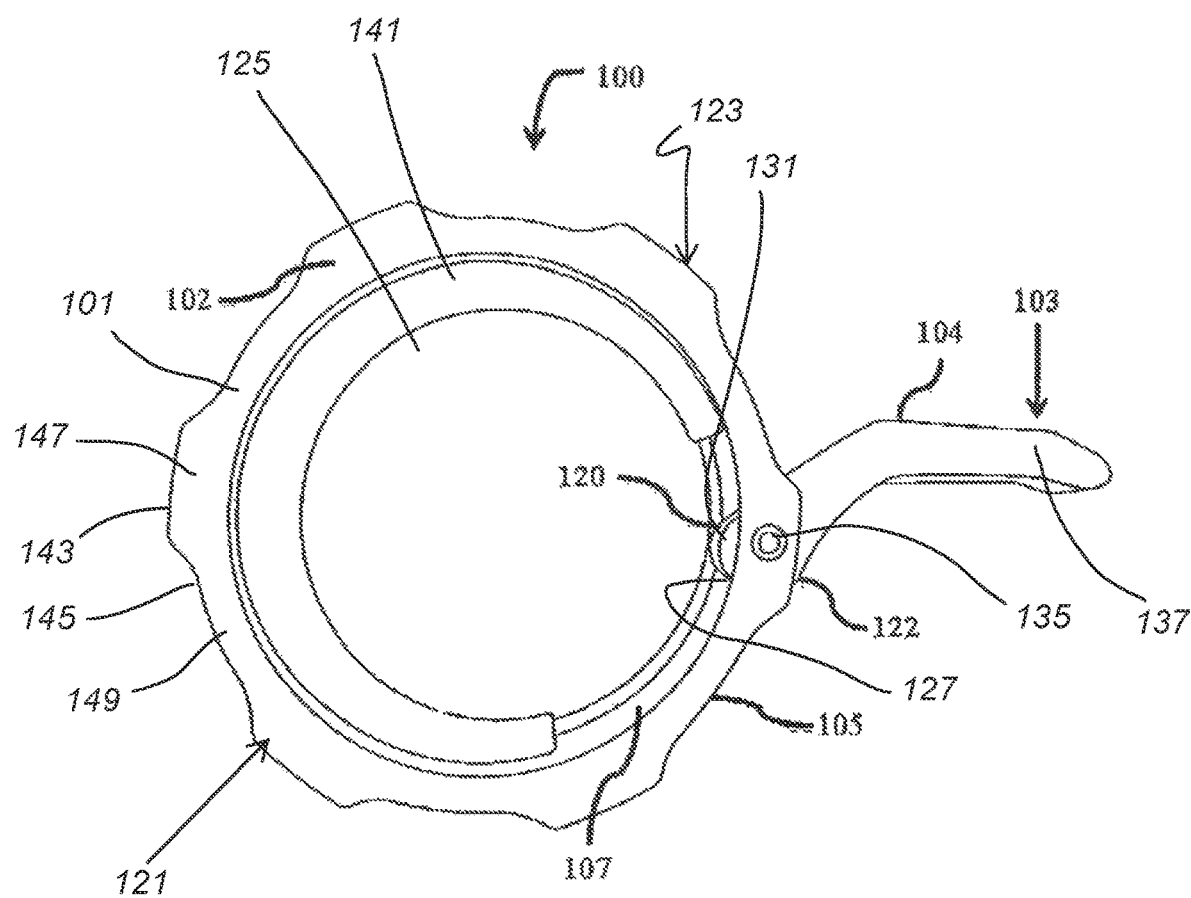
FIG. 4 is a perspective view of another exemplary embodiment of the invention in the open position.
Figure 5:
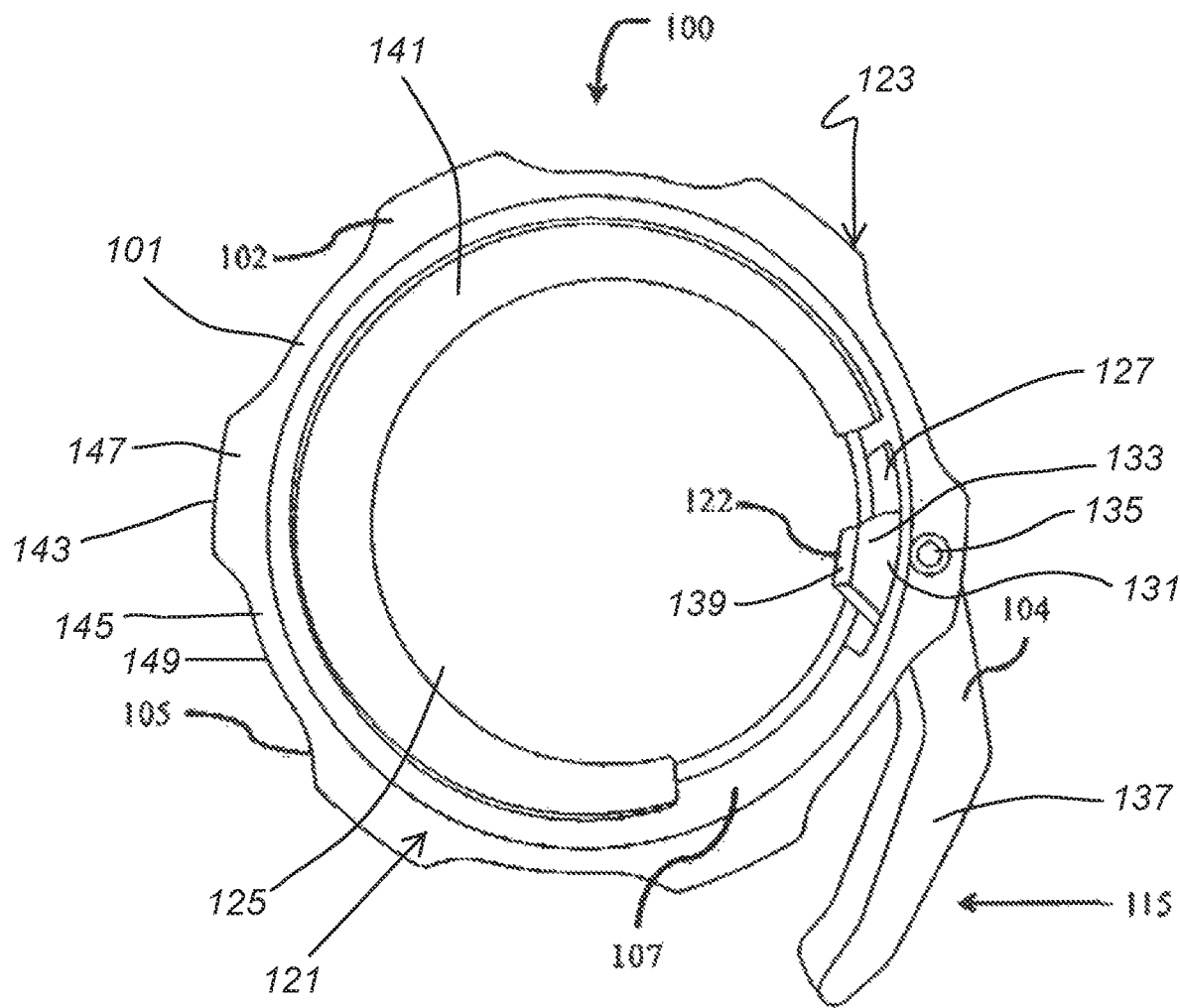
FIG. 5 is a perspective view of an exemplary embodiment of the invention in the closed position.
Figure 6:
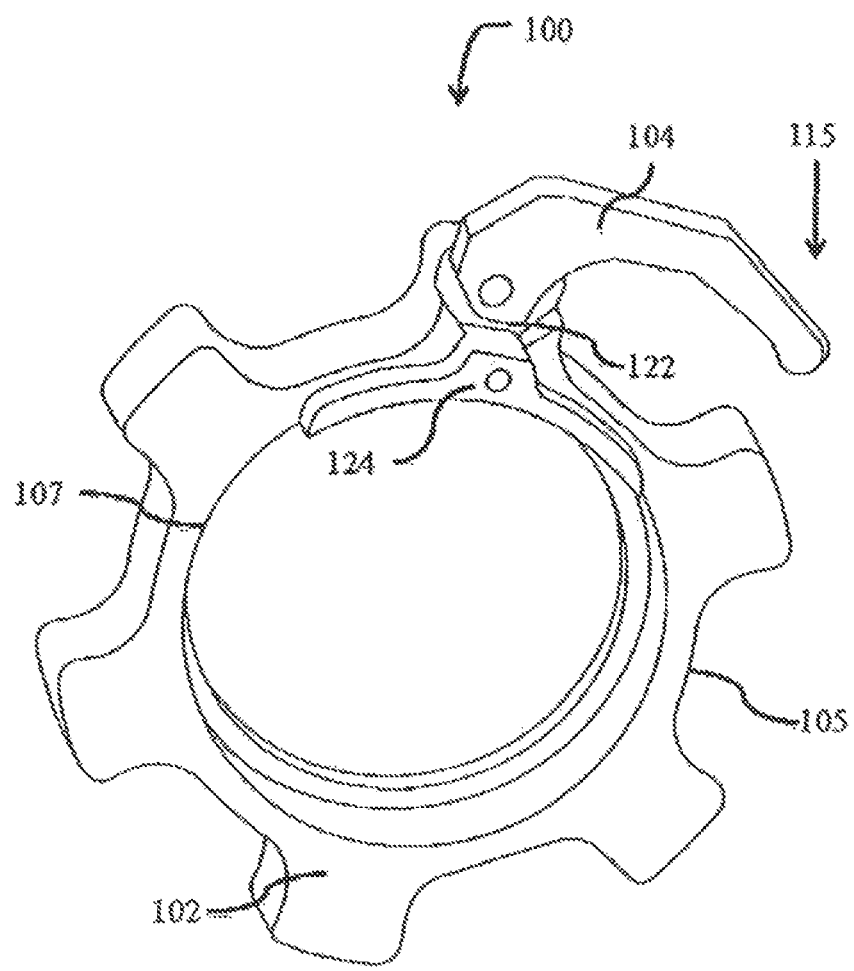
FIG. 6 is a perspective view of another exemplary embodiment of the invention in the opened position.

FIGS. 4 and 5 show another exemplary embodiment of the clamping device 100 where the means for releasably engaging the elongated member 104 includes an end portion 131 of the lever 104 having an upper end 120 and a lower end 122, such that when said means for releasably engaging the elongated member 104 is in the closed position 115, the lower end thereof 122 extends below the interior surface 107 of said primary member 102 and has an engagement surface 139 to contact the elongated member. FIG. 4 shows the means for releasably engaging the elongated member 104 in the open position 103. FIG. 6 shows another exemplary embodiment of the clamping device 100 where lower end 122 of means for releasably engaging the elongated member 104 depresses an engaging agent 124. The primary member 102 has an opening 127 with a boundary entirely defined by the generally cylindrical body 101 between the front and rear surfaces 121, 123 and extending through the thickness of the generally cylindrical body 101. The lower end 122 extends through the opening 127 to engage the elongated member 104 in the closed position 115. The end portion 131 of the lever 104 is pivotably connected to the primary member 102 proximate to the opening 127 at a pivot connection point 135, and an elongated arm 137 extends from the end portion 131. The end portion 131 of the lever 104 is enlarged with respect to the elongated arm 137 and has a projection 133 on which the lower end 122 is defined in the embodiment of FIGS. 4-5. The exterior surface 105 of the primary member 102 in FIGS. 4-5 has a plurality of alternating raised portions 143 and recessed portions 145 that extend an entire circumferential distance of the exterior surface 105. In the embodiment of FIGS. 4-5, the pivot connection point 135 extends through one of the raised portions 143, and the opening 127 is formed at least partially through one of the raised portions 143. The clamping device 100 in one embodiment also includes a secondary member 141 that extends around a portion of the interior surface 107 of the primary member 102, and the secondary member 141 may extend around at least half of a circumferential distance of the interior surface 107 as shown in FIGS. 4-5.

The clamping device 100 can be created using multiple types of feedstock, that is to say the main raw material used in the manufacture of a product. In one exemplary embodiment, the clamping device 100 is made from an aluminum alloy (not indicated). In a preferred embodiment, the aluminum alloy 6061 Billet, formerly referred to as Alloy 61S. Other preferred materials for construction of the clamping device 100 include plastics (not indicated) and steel (not indicated). It is also possible to use different materials to construct different component parts of the clamping device 100.

The preferred embodiment easily and quickly engages the exercise equipment. The preferred embodiment is also able to easily and quickly disengaged from the exercise equipment to allow for weights to be conveniently removed or added to the exercise equipment.

It should be understood that the invention is not limited in its application to the details of the particular arrangement shown here since the invention is capable of other embodiments, some of which may be quite different from those of the disclosed embodiments. While the foregoing written description of the invention enables one of ordinary skill in the art to make and use what is presently considered by the inventor to be the best mode of the invention, a device may be practiced which incorporates other structural and/or functional details in addition to or other than the structural and/or functional details set forth herein. It should therefore be understood that the present invention is not limited to the embodiments described above, but encompasses any and all embodiments within the scope and spirit of the invention as claimed.

What is claimed is:

1. A clamping device comprising:
    a primary member comprising a generally cylindrical body defining a central passage and having a front surface, a rear surface opposite the front surface, and opposed interior and exterior surfaces, the generally cylindrical body extending between a first extremity and a second extremity, wherein the primary member is configured to receive an elongated member through the central passage;
    wherein the generally cylindrical body has a thickness defined between the interior surface and the exterior surface, wherein the generally cylindrical body comprises a plurality of alternating thin sections and thick sections having increased thickness with respect to the thin sections, and wherein the thick sections and the thin sections form alternating raised and recessed portions on the interior surface; and
    a lever pivotably connected to the primary member proximate to the first and second extremities, the lever being moveable by rotation between an open position and a closed position, wherein the first and second extremities are closer together in the closed position than in the open position, thereby reducing a width of the central passage in the closed position.

2. The clamping device of claim 1, wherein the alternating raised and recessed portions extend an entire circumferential distance of the interior surface.

3. The clamping device of claim 1, wherein the primary member is formed of a single, continual piece.

4. The clamping device of claim 1, wherein the recessed portions have generally rectangular shapes.

5. The clamping device of claim 1, wherein the first extremity has a first pin and the second extremity has a second pin, and the lever has a first hole receiving the first pin and a second hole receiving the second pin, wherein the first and second pins are configured to respectively travel along the first and second holes during movement of the lever between the open and closed positions, and wherein the first and second pins are spaced by a first distance in the open position and by a second distance that is smaller than the first distance in the closed position, such that the lever is configured to bring the first and second extremities of the generally cylindrical body closer together in moving from the open position to the closed position by engagement between the first and second pins and the first and second holes, thereby reducing the width of the central passage.

6. The clamping device of claim 5, wherein the lever comprises an enlarged end portion having the first and second holes extending therethrough and an elongated arm extending from the enlarged end portion.

7. The clamping device of claim 5, wherein the first and second pins are parallel to the interior and exterior surfaces.

8. The clamping device of claim 1, wherein the exterior surface forms a single, continuous, cylindrical exterior surface extending between the front and rear surfaces and over an entire circumferential distance between the first and second extremities, and the interior surface forms a single, continuous interior surface extending between the front and rear surfaces and over the entire circumferential distance between the first and second extremities, the single, continuous interior surface including continuous surfaces of all of the alternating raised portions and recessed portions.

9. A clamping device comprising:
    a primary member formed of a single, continual piece and comprising a generally cylindrical body defining a central passage and having a front surface, a rear surface opposite the front surface, and opposed interior and exterior surfaces, the generally cylindrical body extending between a first extremity and a second extremity, wherein the primary member is configured to receive an elongated member through the central passage;
    wherein the generally cylindrical body has a thickness defined between the interior surface and an exterior surface, and the generally cylindrical body includes a plurality of alternating thin sections and thick sections having increased thickness with respect to the thin sections, and wherein the thick sections and the thin sections form alternating raised and recessed portions on the interior surface; and
    a lever having an end portion pivotably connected to the primary member and an elongated arm extending from the end portion, the lever being moveable by rotation between an open position and a closed position, such that when in the open position, the primary member is not configured to engage the elongated member to hold the clamping device in position with respect to the elongated member, and when in the closed position, the primary member is configured to engage the elongated member to hold the clamping device in position with respect to the elongated member.

10. The clamping device of claim 9, wherein the alternating raised and recessed portions extend an entire circumferential distance of the interior surface.

11. The clamping device of claim 9, wherein the central passage extends between an opening in the front surface and an opening in the rear surface of the primary member.

12. The clamping device of claim 9, wherein the recessed portions have generally rectangular shapes.

13. The clamping device of claim 9, wherein the first extremity has a first pin and the second extremity has a second pin, and the lever has a first hole receiving the first pin and a second hole receiving the second pin, wherein the first and second pins are configured to respectively travel along the first and second holes during movement of the lever between the open and closed positions, and wherein the first and second pins are spaced by a first distance in the open position and by a second distance that is smaller than the first distance in the closed position, such that the lever is configured to bring the first and second extremities of the generally cylindrical body closer together in moving from the open position to the closed position by engagement between the first and second pins and the first and second holes, thereby reducing a width of the central passage.

14. The clamping device of claim 13, wherein the end portion of the lever is an enlarged end portion having the first and second holes extending therethrough and an elongated arm extending from the enlarged end portion.

15. The clamping device of claim 13, wherein the first and second pins are parallel to the interior and exterior surfaces.

16. The clamping device of claim 9, wherein the exterior surface forms a single, continuous, cylindrical exterior surface extending between the front and rear surfaces and over an entire circumferential distance between the first and second extremities, and the interior surface forms a single, continuous interior surface extending between the front and rear surfaces and over the entire circumferential distance between the first and second extremities, the single, continuous interior surface including continuous surfaces of all of the alternating raised portions and recessed portions.

17. A clamping device comprising:
   a primary member formed of a single, continual piece and comprising a generally cylindrical body defining a central passage and having a front surface, a rear surface opposite the front surface, and opposed interior and exterior surfaces, the generally cylindrical body extending between a first extremity and a second extremity, wherein the primary member is configured to receive an elongated member through the central passage;
   wherein the generally cylindrical body has a thickness defined between the interior surface and the exterior surface, wherein the generally cylindrical body comprises a plurality of alternating thin sections and thick sections having increased thickness with respect to the thin sections, and wherein the thick sections and the thin sections form alternating raised and recessed portions on the interior surface;
   wherein the exterior surface forms a single, continuous, cylindrical exterior surface extending between the front and rear surfaces and over an entire circumferential distance between the first and second extremities, and the interior surface forms a single, continuous interior surface extending between the front and rear surfaces and over the entire circumferential distance between the first and second extremities, the single, continuous interior surface including continuous surfaces of all of the alternating raised portions and recessed portions; and
   means for releasably engaging the elongated member when the elongated member is received in the central passage.

18. The clamping device of claim 17, wherein the alternating raised and recessed portions extend the entire circumferential distance of between the first and second extremities along the interior surface.

19. The clamping device of claim 17, wherein the recessed portions have generally rectangular shapes.

20. The clamping device of claim 17, wherein the means for releasably engaging the elongated member comprises a lever pivotably connected to the primary member, wherein the lever is moveable between an open position, wherein the clamping device is configured not to engage the elongated member, and a closed position, wherein the clamping device is configured to engage the elongated member to hold the clamping device in position with respect to the elongated member.

* * * * *